No. 723,596. PATENTED MAR. 24, 1903.
W. C. FERGUSON.
PROCESS OF MAKING SULFURIC ANHYDRID.
APPLICATION FILED JUNE 12, 1902.
NO MODEL.
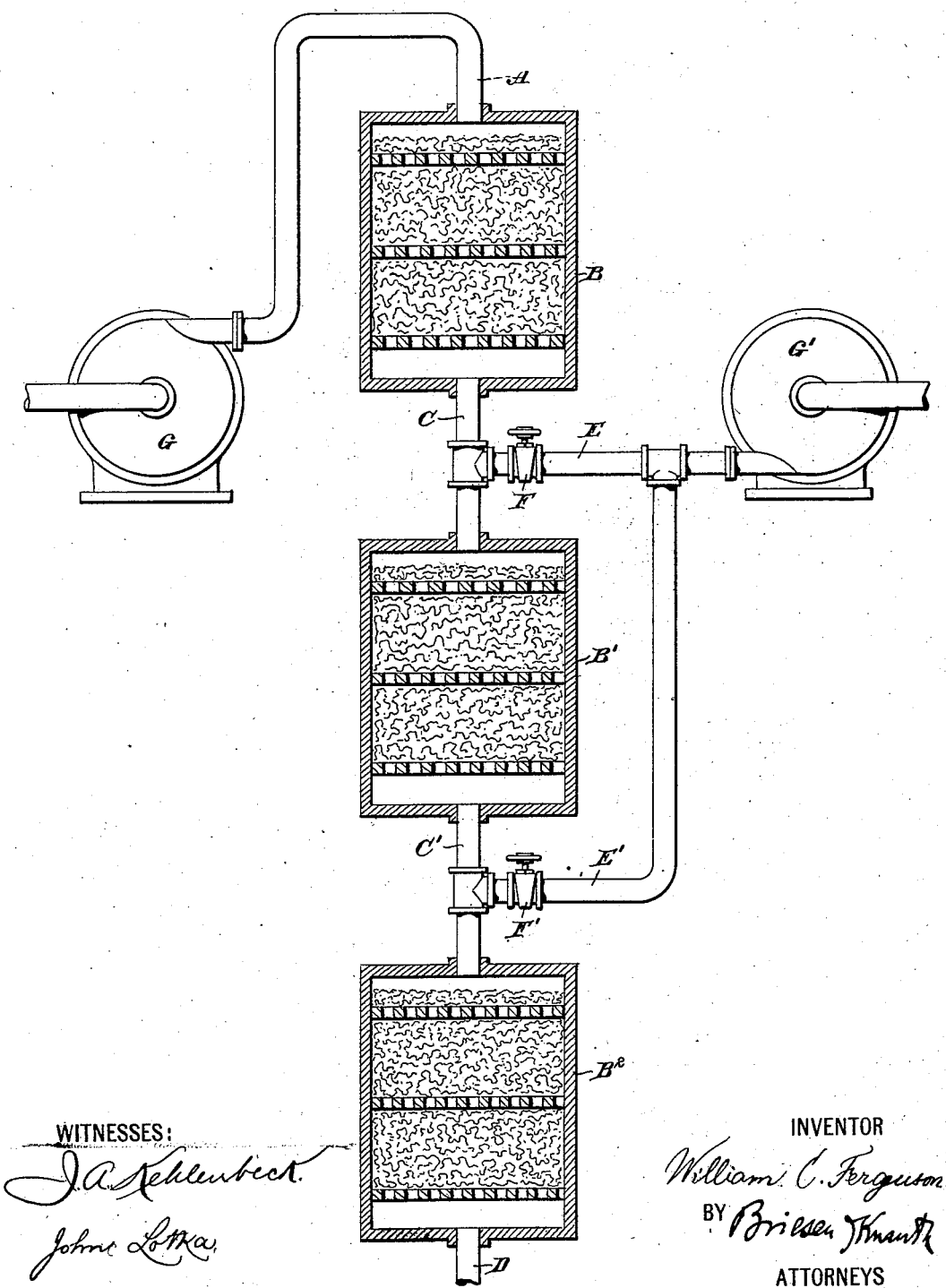

UNITED STATES PATENT OFFICE.

WILLIAM C. FERGUSON, OF FLUSHING, NEW YORK, ASSIGNOR TO GENERAL CHEMICAL COMPANY, OF NEW YORK, N. Y., A CORPORATION OF NEW YORK.

PROCESS OF MAKING SULFURIC ANHYDRID.

SPECIFICATION forming part of Letters Patent No. 723,596, dated March 24, 1903.

Application filed June 12, 1902. Serial No. 111,244. (No specimens.)

*To all whom it may concern:*

Be it known that I, WILLIAM C. FERGUSON, a citizen of the United States, residing at Flushing, county of Queens, State of New York, have invented certain new and useful Improvements in the Manufacture of Sulfuric Anhydrid, of which the following is a specification.

My invention relates to the manufacture of sulfuric anhydrid according to the contact process, and has for its object to reliably regulate the temperature of the gaseous mixture, and consequently of the contact-chambers, and to gradually dilute the gaseous mixture so as to obtain a high efficiency in the output.

The invention will be fully described hereinafter and the features of novelty pointed out in the appended claims.

The accompanying drawing is an elevation of a plan suitable for carrying out my invention.

The drawing shows at A the inlet of the gases containing sulfurous-acid gas, ($SO_2$.)

B is the first contact-chamber, from which a connecting-pipe C leads to the second contact-chamber B', the outlet of which is at another connecting-pipe C', leading to a third contact-chamber B². The outlet of this last-named chamber is indicated at D. The number of contact-chambers may be increased or diminished, but at least two of them are employed. Each connecting tube or pipe C C' is provided with a branch E E', respectively, and the connection of these branches with pipes C C' may be controlled by means of valves F F'. Any suitable device, as a blower G, may be employed for forcing the gaseous substances through the contact-chambers.

At A, I admit into the first contact-chamber B a mixture of sulfurous-acid gas, ($SO_2$,) oxygen, and nitrogen. This mixture may be what is known as "burner-gas." It should, however, preferably contain a larger proportion of sulfurous-acid gas than usual—eleven per cent. of $SO_2$, I consider a suitable proportion. This mixture in passing through the contact-chamber B becomes partly converted into sulfuric anhydrid, ($SO_3$.) It will be obvious that, owing to this partial conversion, the mixture becomes poor in free oxygen, and this may diminish the capability of the remainder of $SO_2$ of becoming converted into sulfuric anhydrid. At the same time considerable heat is generated by the conversion, even if it is only a partial one, and the mixture is carried to a temperature which is beyond that most suitable for the continuation of the contact process. It is therefore desirable that the mixture should be cooled, and it is also desirable that before the continuation of the contact process an additional amount of air or oxygen should be introduced into the mixture. It is preferable that the cooling just mentioned should take place during an interruption of the contact process, or, in other words, between two separate contact operations. By thus proceeding I am enabled to better mix the added cool air or oxygen with the partially-converted mixture and to avoid a cooling action upon the preceding contact-chamber, which might be detrimental. For this purpose I carry the partially-converted product away from the catalytic substances and admix to it, preferably, while it is on its way from one contact-chamber to the next (and not within the contact-chamber) a suitable amount of air which arrives through the pipes E E' and may be regulated by the cocks or valves F F'. The air may be fed by a blower G'. The mixture entering into the second contact-chamber is thus cooled to the temperature best suited for the contact reaction and, moreover, contains sufficient oxygen for continuing the conversion of the $SO_2$ into $SO_3$. The operation is repeated in the same manner between the second and third contact-chambers. By adding air to the partially-converted mixture after the latter has been carried away from the contact-chamber I avoid to a very considerable extent any cooling effect which the said air might have upon the preceding contact-chamber. Furthermore, it will be observed that the addition of air takes place in a comparatively narrow pipe, so that the air comes in contact with practically every particle of the partially-converted mixture, and as the latter streams through the pipe at a materially-increased speed (as compared with that with which it moves in the contact-chamber proper) the thorough mixture is further promoted by the state of agitation or rapid motion in which the mixture passes from one chamber to the next. It will be understood that these features of my invention while contributing to produce the results in the best form of my invention now known to me are not all absolutely essential and that some of them may be omitted without entirely sacrificing the advantages of my invention.

It will be obvious that my improved process, as above described, is also useful on account of the reduced wear of the contact-chambers and the material therein, since the temperature does not rise so high as it would if the entire reaction were completed in a single contact-chamber. The use of a mixture rich in $SO_2$ has the advantage of reducing the volume of the original mixture brought into the first contact-chamber as compared with a poorer mixture containing the same amount of $SO_2$—that is, in my process the volume of the original gaseous mixture for the same output of anhydrid is reduced. This is of twofold advantage. First, there is less danger of the accidental formation of anhydrid before the beginning of the contact process, inasmuch as the supply of free oxygen is smaller, and, second, the purification of the mixture previous to the contact process is facilitated partly because the mixture contains less anhydrid (the presence of which renders the purification more difficult) and partly because of the reduced volume of the mixture. The cost of scrubbing is therefore materially decreased.

It will be understood that for practical reasons I prefer to admit atmospheric air through the pipes E E' instead of pure oxygen; but I desire it to be understood that oxygen might be used, and that the term "air" as used in the claims is to be interpreted as covering oxygen as an equivalent. The air may be admitted at ordinary temperature, or, if an energetic cooling action is desired, the air may first be artificially cooled.

It will be understood that by adding air to the partially-converted mixture I produce a new mixture in which the proportion of free oxygen to $SO_2$ is higher than it would be if instead of a certain volume of air I added the same volume of the original mixture containing air and $SO_2$. In the latter case obviously the new mixture would contain a larger proportion of $SO_2$ to O than the partially-converted mixture, while with my process the proportion of free oxygen is increased, so that the second reaction becomes more efficient and more complete than the first. The air or gas added to the partially-converted mixture contains a larger proportion of free oxygen than the original mixture entering the first contact-chamber, and owing to the change of proportions the second reaction is more complete than the first.

What I claim as new, and desire to secure by Letters Patent, is—

1. The process of producing sulfuric anhydrid which consists in bringing a mixture containing sulfurous-acid gas and air into contact with catalytic substances in such proportions as to convert only a portion of the sulfurous-acid gas into sulfuric anhydrid, then carrying the partially-converted mixture away from the catalytic substances, and mixing cool air with the said partially-converted product, and thereupon bringing the mixture of such air and the partially-converted product into renewed contact with catalytic substances to continue the conversion into sulfuric anhydrid.

2. The process of manufacturing sulfuric anhydrid, which consists in bringing a mixture containing air and a high proportion of sulfurous-acid gas into contact with catalytic substances in such proportions as to convert only a portion of the sulfurous-acid gas into sulfuric anhydrid, carrying the partially-converted product, which is relatively poor in oxygen, away from the catalytic substances, adding to the partially-converted product, while it is away from the catalytic substances, a suitable amount of air to cool said product and to supply additional oxygen, and thereupon bringing the mixture of air and partially-converted product in renewed contact with catalytic substances to continue the conversion of sulfurous-acid gas into sulfuric anhydrid.

3. The process of producing sulfuric anhydrid which consists in bringing a mixture containing sulfurous-acid gas and free oxygen into contact with catalytic substances in such proportions as to convert only a portion of the sulfurous-acid gas into sulfuric anhydrid, then carrying the partially-converted mixture away from the catalytic substances, and adding to the partially-converted product a gaseous medium containing a larger proportion of free oxygen than the original mixture, and thereupon bringing the new mixture formed by said medium and by the partially-converted product, into renewed contact with catalytic substances to continue the conversion into sulfuric anhydrid.

In testimony whereof I have signed my name to this specification in the presence of two subscribing witnesses.

WILLIAM C. FERGUSON.

Witnesses:
JOHN LOTKA,
EUGENE EBLE.